(12) United States Patent
Umemoto et al.

(10) Patent No.: US 7,612,545 B2
(45) Date of Patent: Nov. 3, 2009

(54) DC/DC CONVERTER

(75) Inventors: Kiyotaka Umemoto, Kyoto (JP); Ko Takemura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 245 days.

(21) Appl. No.: 10/595,785

(22) PCT Filed: Nov. 11, 2004

(86) PCT No.: PCT/JP2004/016720

§ 371 (c)(1),
(2), (4) Date: Apr. 5, 2007

(87) PCT Pub. No.: WO2005/046036

PCT Pub. Date: May 19, 2005

(65) Prior Publication Data

US 2008/0019160 A1    Jan. 24, 2008

(30) Foreign Application Priority Data

Nov. 11, 2003    (JP) .............................. 2003-380575

(51) Int. Cl.
    *G05F 1/40*    (2006.01)
    *G05F 1/10*    (2006.01)
(52) U.S. Cl. ..................................... 323/271; 323/222
(58) Field of Classification Search ................ 323/222, 323/225, 268, 271, 282, 285, 286
    See application file for complete search history.

(56) References Cited

U.S. PATENT DOCUMENTS 6,064,187 A    5/2000    Redl et al.
6,229,292 B1    5/2001    Redl et al.
6,320,359 B1*    11/2001    Nagaya et al. .............. 323/224
6,870,354 B2*    3/2005    Nishimaki ................... 323/284
6,873,140 B2*    3/2005    Saggini et al. .............. 323/283
2003/0201760 A1    10/2003    Umemoto et al.

FOREIGN PATENT DOCUMENTS

| JP | 11-75367 | 3/1999 |
| JP | 2000-299978 | 10/2000 |
| JP | 2003-319643 | 11/2003 |
| JP | 2004-320892 | 11/2004 |

OTHER PUBLICATIONS

International Search Report issued in the corresponding International Application No. PCT/JP2004/016720, mailed on Mar. 8, 2005.

* cited by examiner

*Primary Examiner*—Matthew V Nguyen
(74) *Attorney, Agent, or Firm*—Keating & Bennett, LLP (57) ABSTRACT

A DC/DC converter includes a switching element which is opened and closed to supply power from an input power supply $V_{cc}$ through a coil to an output terminal, which is connected to a load, and to adjust the voltage at the output terminal. The DC/DC converter also includes a coil current detection resistor arranged to detect a coil current, a smoothing capacitor connected to the load side of the coil current detection resistor and arranged to smooth the voltage at the output terminal, a reference current value control circuit arranged to detect the voltage on the coil side of the coil current detection resistor to control a reference current value of the coil current, a clock generator arranged to generate a reference clock, and a feedback circuit arranged to close the switching element in synchrony with the reference clock and to open the switching element when the coil current exceeds the reference current value.

6 Claims, 6 Drawing Sheets

DC/DC CONVERTER

BACKGROUND OF THE INVENTION

1. Field of the Invention

The present invention relates to a DC/DC converter for converting an inputted power supply voltage into a predetermined DC voltage, and more particularly, to a current-mode DC/DC converter.

2. Description of the Related Art

DC/DC converters include DC/DC converter types which include a switching element located between a power input terminal and a terminal for outputting a predetermined DC voltage, connected to a load, wherein a predetermined DC voltage is maintained through opening and closing of the switching element. Such DC/DC converters are widely used because of their small size and the high efficiency that they provide. There exists an approach for controlling the opening and closing of the switching element, involving detecting and feeding back the current flowing in a coil connected to the switching element (for instance, Japanese Patent Application Laid-open No. H11-75367, Japanese Patent Application Laid-open No. 2003-319643, and Japanese Patent Application No. 2003-111242 which corresponds to Japanese Patent Application Laid Open No. 2004-320892). A converter using that technique is called a current-mode DC/DC converter.

Figure 5:
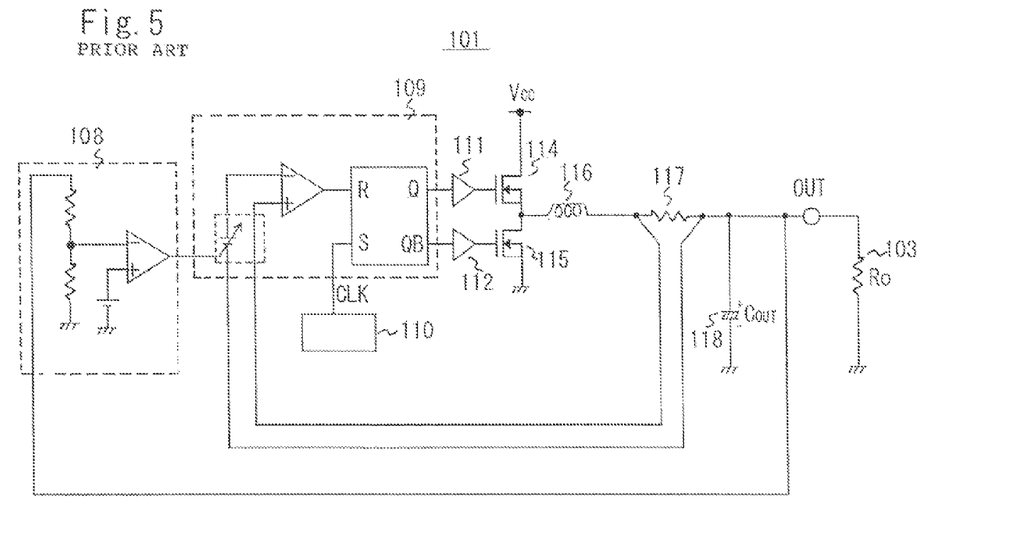
FIG. 5 is circuit diagram of a conventional DC/DC converter.

FIG. 5 illustrates a circuit example of a current-mode DC/DC converter. This DC/DC converter 101 includes a switching element 114 and a coil 116 which correspond to the above-described constituent elements. Through the opening and closing of the switching element 114, power from an input power supply ($V_{CC}$) is supplied via a coil 116 to an output terminal OUT, connected to a load 103, so as to preserve a predetermined DC voltage at the output terminal OUT.

In addition to the switching element 114 and the coil 116, the DC/DC converter 101 includes a switching element 115 connected in series to the switching element 114, for performing an opening and closing operation alternately with the switching element 114, a coil current detection resistor 117 for detecting current flowing in the coil 116, a smoothing capacitor 118 connected to the load-side of the coil current detection resistor 117, for smoothing voltage at an output terminal OUT, a reference current value control circuit 108 for detecting voltage on the load side of the coil current detection resistor 117, and for controlling a reference current value which is a maximum current flowing in the coil 116, a clock generator 110 for generating a reference clock CLK, a feedback circuit 109 for, in synchrony with the reference clock CLK, outputting signals for the opening and closing operation, specifically, signals for closing the switching element 114 (opening the switching element 115) until the current flowing in the coil 116 exceeds the reference current value, and for opening the switching element 114 (closing the switching element 115) when the current flowing in the coil 116 exceeds the reference current value, and buffers 111, 112 provided between the feedback circuit 109 and the switching elements 114, 115.

An electrolytic capacitor, which has large-capacitance, is ordinarily used as the smoothing capacitor 118 in this DC/DC converter 101, with a view to suppressing output voltage ripple (fluctuation) and improving transient response by changing the output current.

Figure 7:
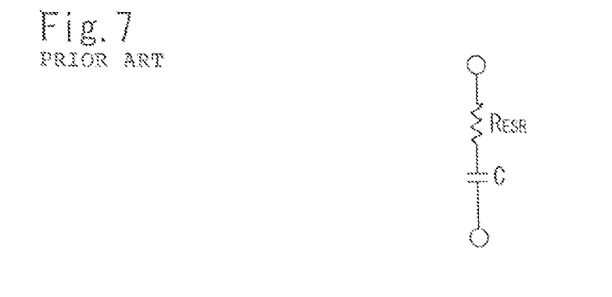
FIG. 7 is an internal circuit diagram of a capacitor.

However, an electrolytic capacitor breaks down when an opposite voltage is applied, on account of excessive noise or by being reverse-connected by mistake since it possesses polarity, and involves also smoke-generation and ignition dangers, by virtue of its internal structure. As illustrated in FIG. 7, a capacitor has, besides a nominal capacitance C, an equivalent series resistance (ESR) derived from lead wires and the internal structure of the capacitor. The large ESR value ($R_{ESR}$) of an electrolytic capacitor results in a large ripple voltage.

In order to solve these problems, the use of a ceramic capacitor has been proposed, since it lacks polarity, poses no smoke-generation and ignition dangers, and has a small ESR value ($R_{ESR}$). However, replacing the electrolytic capacitor with a ceramic capacitor in the circuit of FIG. 5 gives rise to the below-described problems of undershoot and overshoot.

Figure 6:
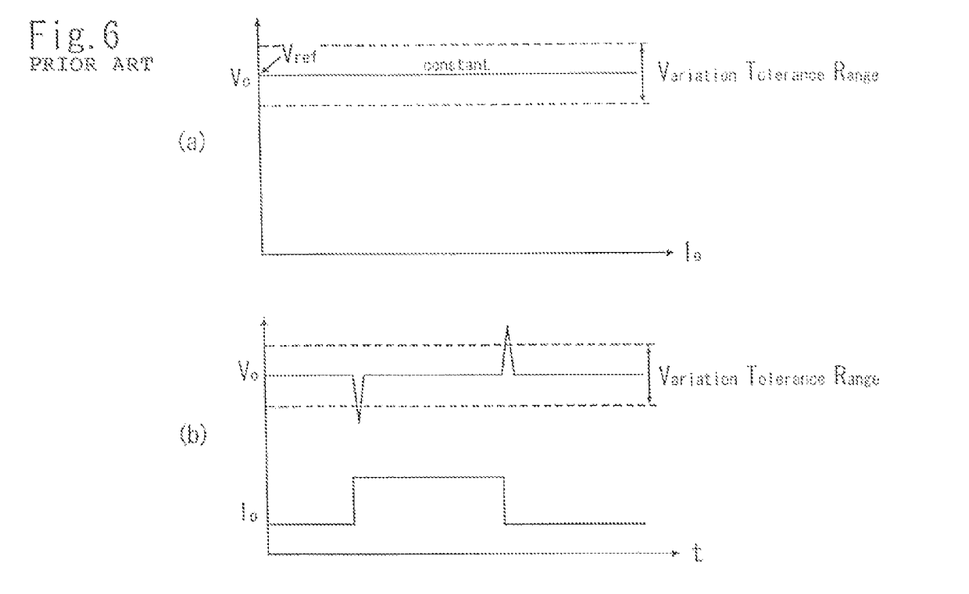
FIG. 6 illustrates the characteristic of output current and voltage at the output terminal of the DC/DC converter of FIG. 5, (a) being a DC characteristic diagram, and (b) being a transient characteristic diagram.

Specifically, undershoot and overshoot occur ordinarily when the output current changes sharply in response to load changes, until the DC/DC converter 101 can respond to such a change through feedback. When a large-capacitance electrolytic capacitor is used in the DC/DC converter 101, undershoot and overshoot are sufficiently suppressed by the charge accumulated in the capacitor so as not to pose problems. A ceramic capacitor, however, is problematic in that its small capacitance affords insufficient undershoot and overshoot suppression, which impairs transient response. FIGS. 6(a) and (b) illustrate this phenomenon. As illustrated in the DC characteristic diagram of FIG. 6(a), the output voltage Vo in the DC/DC converter 101 is kept at the set voltage $V_{ref}$ whether the output current $I_O$ increases or decreases. Large undershoot and overshoot generated upon sharp changes in the output current cannot be suppressed when a ceramic capacitor is used, as illustrated in FIG. 6(b).

Figure 8:
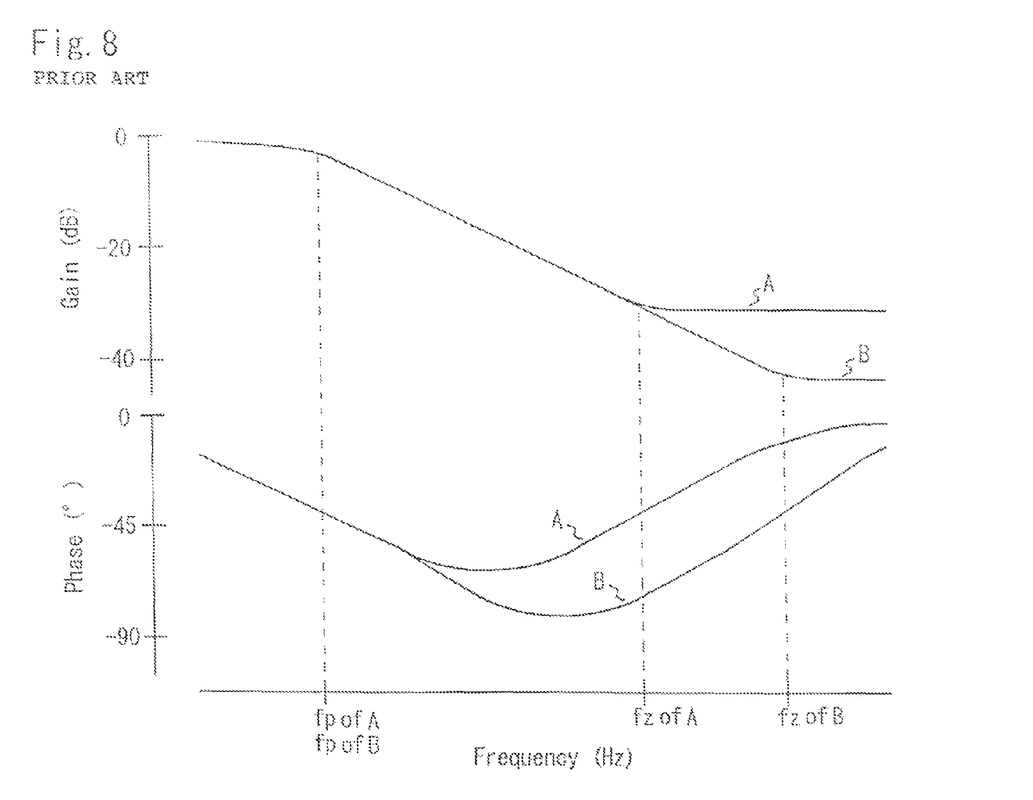
FIG. 8 is a frequency characteristic diagram of a DC/DC converter.

Since the ESR value ($R_{ESR}$) of a ceramic capacitor is small, moreover, the DC/DC converter 101 is problematic in that it is prone to undergo oscillation. On account of the load 103 and the smoothing capacitor 118, the DC/DC converter 101 has 1-pole, 1-zero frequency characteristics such as the characteristic curve A and characteristic curve B illustrated in FIG. 8. The pole frequency ($f_P$) and the zero frequency ($f_Z$) are given by the formulas below.

$$f_P = 1/(2\pi \cdot R_O \cdot C_{OUT}) \qquad (1)$$

$$f_Z = 1/(2\pi \cdot R_{ESR} \cdot C_{OUT}) \qquad (2)$$

In the formulas, $R_O$ is the resistance of the load, $C_{OUT}$ is the capacitance of the smoothing capacitor 118, and $R_{ESR}$ is the ESR value of the smoothing capacitor 118. The X-axis in FIG. 8 is a logarithmic scale, and the $f_P$ of characteristic curve A and characteristic curve B in the figure are depicted as coinciding with each other.

The larger the frequency difference between $f_P$ and $f_Z$ is, the larger the maximum angle of phase rotation becomes. In FIG. 8, for instance, the frequency difference between $f_P$ and $f_Z$ of characteristic curve B is larger than that of characteristic curve A, and hence the maximum angle of phase rotation of the former is larger as well. A large maximum angle of phase rotation, to which further phase rotation on account of element delay, etc., in the circuits constituting the DC/DC converter 101 (for instance, the reference current value control circuit 108, the feedback circuit 109, etc.) is added, can easily give rise to oscillation. Conversely, phase rotation is less and oscillation hardly occurs as the frequency difference becomes smaller.

Values of $f_P$=965 Hz and $f_Z$=24.1 KHz are obtained by substituting in formulas (1) and (2) specific values ($C_{OUT}$=330 µF, $R_{ESR}$=20 mΩ) of a case where the smoothing capacitor 118 is an electrolytic capacitor, with $R_O$=0.5Ω. That is, $f_Z$ is 25 times as large as $f_P$. Oscillation is unlikely to occur in practice with such a $f_Z$ and $f_P$ difference. On the other hand, values of $f_P$=3.18 KHz and $f_Z$=318 KHz are obtained by substituting specific values ($C_{OUT}$=100 µF, $R_{ESR}$=5 mΩ) of a case where the smoothing capacitor 118 is a ceramic capacitor. The value of $f_Z$ is thus 100 times as large as $f_P$, a considerable frequency difference likely to result in oscillation. $C_{OUT}$=100 µF is the maximum capacitance of a ceramic capacitor.

SUMMARY OF THE INVENTION

In order to overcome the problems described above, preferred embodiments of the present invention provide a DC/DC converter that does not deteriorate transient response upon load changes and that suppresses the occurrence of oscillation phenomena, even when using a smoothing capacitor having a small ESR value ($R_{ESR}$) and a small capacitance.

A DC/DC converter according to a preferred embodiment of the present invention is a DC/DC converter for, through the opening and closing of a switching element, supplying power from an input power supply, via a coil, to an output terminal connected to a load, and adjusting the voltage of the output terminal, the DC/DC converter including a coil current detection element interposed between the coil and the output terminal, a smoothing capacitor connected to the load side of the coil current detection element so as to smooth the voltage of the output terminal, a reference current value control circuit arranged to detect the voltage of the coil side of the coil current detection element and to control a reference current value of a current flowing in the coil, and a feedback circuit arranged to close the switching element in synchrony with a reference clock of a clock generator, and open the switching element when the current flowing in the coil exceeds the reference current value.

In one preferred embodiment of the present invention, the coil current detection element is preferably a coil current detection resistor.

In one preferred embodiment of the present invention, the smoothing capacitor is preferably a ceramic capacitor.

In another preferred embodiment of the present invention, the equivalent series resistance value of the smoothing capacitor is smaller than that of an electrolytic capacitor.

The resistance value of the coil current detection element is preferably larger than the equivalent series resistance value of the smoothing capacitor.

The zero frequency of a frequency characteristic is preferably determined by the coil current detection element and the smoothing capacitor.

A DC/DC converter according to another preferred embodiment of the present invention is a DC/DC converter for, through the opening and closing of a switching element, supplying power from an input power supply, via a coil, to an output terminal connected to a load, and adjusting the voltage of the output terminal, with feedback to the switching element, the DC/DC convert including a coil current detection element interposed between the coil and the output terminal so as to detect current flowing in the coil, and a smoothing capacitor connected to the load side of the coil current detection element so as to smooth the voltage of the output terminal, wherein the zero frequency of a frequency characteristic is determined by the coil current detection element and the smoothing capacitor.

The reference current value control circuit in the DC/DC converter of various preferred embodiments of the present invention detects voltage on the coil side of a coil current detection element and controls a reference current value of the current flowing in the coil. As a result, the transient response is prevented from being deteriorated upon load changes and the occurrence of oscillation phenomena is suppressed, even when using a smoothing capacitor having a small ESR value ($R_{ESR}$) and small capacitance. Moreover, using a ceramic capacitor as the smoothing capacitor precludes breakdown on account of polarity, averts smoke-generation and ignition dangers, and, due to a small ESR value ($R_{ESR}$), allows reducing output voltage ripple.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
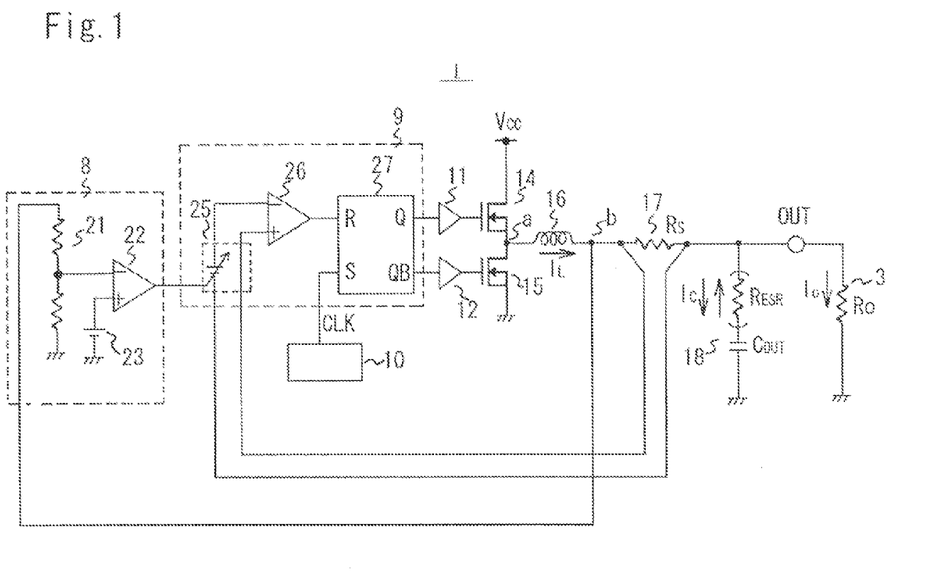
FIG. 1 is a circuit diagram of a DC/DC converter in accordance with a preferred embodiment of the present invention.

Preferred embodiments of the present invention are explained below with reference to accompanying drawings. FIG. 1 is a circuit diagram of a DC/DC converter according to a preferred embodiment of the present invention.

Through the opening and closing a switching element 14 of an N-type MOS transistor, the DC/DC converter 1 supplies power from an input power supply ($V_{CC}$) to an output terminal OUT connected to a load 3 via a coil 16, and regulates the output terminal OUT so as to maintain a predetermined DC voltage. The DC/DC converter 1 preferably includes a coil current detection resistor 17 that is part of a coil current detection element that detects a coil current $I_L$ (the current flowing in the coil 16). The coil current detection resistor 17 is interposed between the coil 16 and the output terminal OUT. The DC/DC converter 1 also preferably includes a smoothing capacitor 18 connected to the load side of the coil current detection resistor 17, so as to smooth the voltage of the output terminal OUT, a reference current value control circuit 8 arranged to detect the voltage of the coil side (connection point b) of the coil current detection resistor 17 and to control a reference current value $I_{Lref}$ of a coil current $I_L$, and a feedback circuit 9 for, in synchrony with a reference clock CLK of a clock generator 10, closing (switching on) the switching element 14 and opening (switching off) the switching element 14 when the coil current $I_L$ exceeds the reference current value $I_{Lref}$. As the smoothing capacitor 18, a highly reliable ceramic capacitor having no polarity and being free of smoke-generation and ignition dangers is preferably used. To make the operation of the smoothing capacitor 18 easier to comprehend, the ESR (equivalent series resistance) of the same is also described in FIG. 1.

More specifically, a first terminal of the switching element 14 of the DC/DC converter 1 is connected to the input power supply ($V_{CC}$) and the second terminal is connected to the coil 16. A second switching element 15 preferably of an N-type MOS transistor is connected to the connection point (connection point a) of the switching element 14 and the coil 16, the other terminal of the second switching element 15 being connected to ground potential. That is, the switching element 14 and the second switching element 15 are high-side and low-side switching elements. The second switching element 15 is controlled so as to open and close in opposite phase to the switching element 14. Though the second switching element 15 may be replaced by a diode, the fact that one terminal of the coil 16 is virtually at ground potential when switched on makes it possible to achieve higher power efficiency than when a diode is used.

The coil current detection resistor 17 is connected to the other terminal (connection point b) of the coil 16 and generates in both terminals a detection voltage proportional to the coil current $I_L$. The main point herein is that a voltage detector 21 including two resistors connected in series is connected to the coil side of the coil current detection resistor 17 (connection point b). The other terminal of the voltage detector 21 is connected to ground potential. These resistors have a resistance value large enough to render the current flowing therethrough substantially negligible as compared to the coil current $I_L$. A connection point of the two resistors is connected to an inversion input terminal of an error amplifier 22, such that the voltage thereof is compared with a reference voltage inputted to a non-inversion input terminal of the error amplifier 22 from a reference power source 23, and is inverted, amplified, and outputted. The output of the error amplifier 22, which together with the voltage detector 21 constitutes the reference current value control circuit 8, controls the reference current value $I_{Lref}$ of the coil current $I_L$, as explained below.

The feedback circuit 9 preferably includes an offset voltage generator 25 for generating an offset voltage commensurate with the output voltage of the error amplifier 22, a comparator 26 for comparing this offset voltage with the detection voltage from the coil current detection resistor 17, and a logic circuit 27 for, on the basis of the reference clock CLK and the output of the comparator 26, controlling the opening and closing of the switching element 14 and the second switching element 15 via buffers 11, 12. The offset voltage, as explained below, corresponds to the reference current value $I_{Lref}$ of the coil current $I_L$.

The output of the error amplifier 22 is inputted into a control input terminal of the offset voltage generator 25, while voltage signals of both terminals of the coil current detection resistor 17 are inputted into the two signal input terminals of the offset voltage generator 25. The offset voltage in response to the voltage of the control input terminal is relatively added to the low-voltage signal of the signal input terminals, and is outputted from two output terminals and inputted to both input terminals of the comparator 26. The comparator 26 outputs a high level if the detection voltage from the coil current detection resistor 17 is higher than the offset voltage, and a low level if the detection voltage from the coil current detection resistor 17 is lower than the offset voltage. The logic circuit 27 includes a flip-flop circuit. In the logic circuit 27, the output of the comparator 26 is inputted to a reset input terminal R, and the reference clock CLK of the clock generator 10 is inputted to a set input terminal S, while the output of a non-inversion output terminal Q is inputted to the switching element 14 via an output buffer 11 and the output of an inversion output terminal QB is inputted to the switching element 15 via an output buffer 12.

Figure 2:
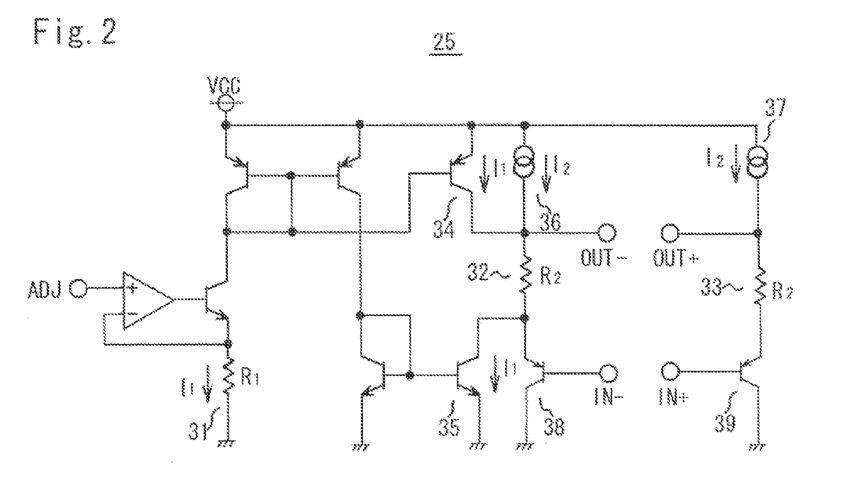
FIG. 2 is a circuit diagram of a voltage generating circuit in the DC/DC converter of FIG. 1.

FIG. 2 illustrates a specific circuit example of the offset voltage generator 25. The output of the error amplifier 22 is connected to a control input terminal ADJ, one terminal on the load side of the coil current detection resistor 17 is connected to a signal input terminal IN−, and one terminal on the coil side of the coil current detection resistor 17 is connected to a signal input terminal IN+, while the inversion input terminal of the comparator 26 is connected to an output terminal OUT− and the non-inversion input terminal of the comparator 26 is connected to an output terminal OUT+. A current $I_1$ corresponding to the control input terminal ADJ flows into a resistor 31 having a resistance value $R_1$. This current $I_1$ is transmitted through current-mirror circuits and flows into a PNP-type transistor 34 and an NPN-type transistor 35 that are connected in series to both terminals of a resistor 32. The resistor 32 and a resistor 33, described below, have a resistance value $R_2$.

The connection point of the resistor 32 and the PNP-type transistor 34 is connected to a constant current source 36, parallel to the PNP-type transistor 34 and through which flows a current $I_2$, and to the output terminal OUT−. The connection point of the resistor 32 and the NPN-type transistor 35 is connected to the emitter of a PNP-type transistor 38 provided in parallel to the NPN-type transistor 35. The both terminals of the resistor 33 are connected to the constant current source 37 through which the current $I_2$ flows, and to the emitter of a PNP-type transistor 39, respectively. The connection point of the resistor 33 and the constant current source 37 is connected to the output terminal OUT+. Furthermore, the voltage of the input terminal IN− is inputted to the base of the PNP-type transistor 38, while the voltage of the input terminal IN+ is inputted to the base of the PNP-type transistor 39.

The voltage at the output terminal OUT− is (VIN−)+(Vf)+$(I_1+I_2) \times R_2$, wherein VIN− is the voltage at the input terminal IN−. The voltage at the output terminal OUT+ is (VIN+)+(Vf)+$I_2 \times R_2$, wherein VIN+ is the voltage at the input terminal IN+. Herein, Vf is the forward bias voltage of the transistors. The voltage difference between the output terminal OUT− and the output terminal OUT+ is therefore (VIN−)−(VIN+)+$I_1 \times R_2$; since $I_1 \times R_2$ is equivalent to $R_2/R_1$ times the voltage of the control input terminal ADJ, this voltage is relatively added, as an offset voltage, to the voltage of the input terminal IN− and is outputted from the output terminal OUT−.

With the construction described above, the offset voltage generator 25 can generate an offset voltage with good precision, though obviously that is also possible with other constructions.

Figure 3:
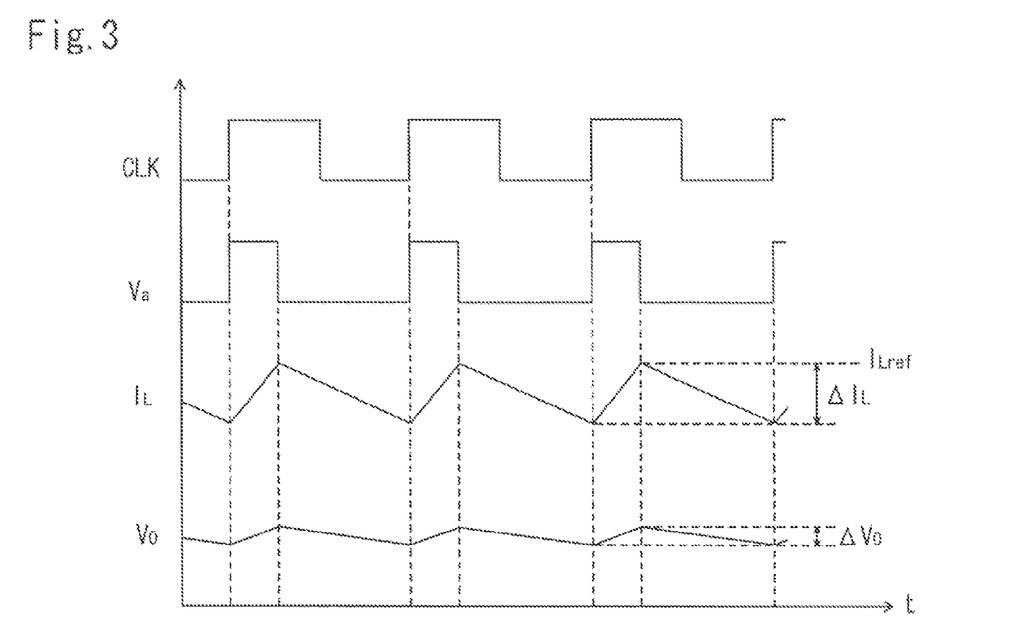
FIG. 3 is an operational waveform diagram of the DC/DC converter of FIG. 1.

The operation of the DC/DC converter 1 is explained next with reference to FIG. 3. In the DC/DC converter 1, the logic circuit 27 is set, and the high-level voltage from the non-inversion output terminal Q and the low-level voltage from the inversion output terminal QB are outputted, at the rising edge of the clock signal CLK from the clock generator 10. The switching element 14 is switched on as a result (and the second switching element 15 is switched off). As a result, the voltage Va of the connection point (a) between the switching element 14 and the coil 16 reaches the level of $V_{CC}$ while the coil current $I_L$ increases linearly. The coil current $I_L$ flowing into the coil current detection resistor 17 continues increasing until the detection voltage, proportional to the coil current $I_L$, exceeds the offset voltage generated by the offset voltage generator 25. When the detection voltage exceeds the offset voltage, i.e., when the coil current $I_L$ exceeds the reference current value $I_{Lref}$, the comparator 26 outputs a high level, the logic circuit 27 is reset, and the non-inversion output terminal Q outputs a low-level voltage while the inversion output terminal QB outputs a high-level voltage. As a result, the switching element 14 is switched off and the second switching element 15 is switched on, whereby the coil current $I_L$ decreases linearly. The above-described operation takes place repeatedly in the DC/DC converter 1.

The reference current value $I_{Lref}$ of the coil current $I_L$ is controlled by the reference current value control circuit 8, which includes the voltage detector 21 and the error amplifier 22, by way of the offset voltage generator 25. In the DC/DC converter 1, specifically, when the voltage on the coil side of the coil current detection resistor 17 (connection point b) falls slightly, the voltage decrement is inverted and amplified by the error amplifier 22, via the voltage detector 21, and is inputted to the control input terminal of the offset voltage generator 25. Thereupon, the offset voltage of the offset voltage generator 25 rises and the reference current value $I_{Lref}$ increases. Conversely, the reference current value $I_{Lref}$ decreases when the voltage on the coil side of the coil current detection resistor 17 (connection point b) rises slightly. The feedback circuit 9 operates to control the reference current value $I_{Lref}$ so as to keep constant the voltage on the coil side of the coil current detection resistor 17 (connection point b).

The ripple (fluctuation) $\Delta V_O$ of the output voltage $V_O$ at the output terminal OUT is explained next. As described above, the coil current $I_L$ repeatedly increases and decreases linearly, and has therefore a certain fluctuation band, which is ripple $\Delta I_L$. The coil current $I_L$ passing through the coil current detection resistor 17 divides into a constant output current $I_O$ flowing into the load 3 from the output terminal OUT and a charge/discharge current $I_C$ of the smoothing capacitor 18. The ripple $\Delta I_L$ of the coil current $I_L$ becomes herein the ripple $\Delta I_C$ of the charge/discharge current $I_C$ of the smoothing capacitor 18. Therefore the ripple $\Delta V_O$ of the output voltage $V_O$ is $$\Delta V_O = \Delta I_C \times R_{ESR} = \Delta I_L \times R_{ESR} \quad (4)$$

wherein $R_{ESR}$ is the ESR value of the smoothing capacitor 18.

As explained above, the smoothing capacitor 18 is preferably a ceramic capacitor having a small $R_{ESR}$, of, for instance, about 5 mΩ. The $R_{ESR}$ of electrolytic capacitors is higher, for instance, about 20 mΩ. When those values are substituted in formula (4), it turns out that a ceramic capacitor allows reducing the ripple voltage $\Delta V_O$ to one fourth of that of an electrolytic capacitor.

The transient response upon load changes in the DC/DC converter 1 is explained next. As described above, the reference current value control circuit 8 and the feedback circuit 9 keep the voltage on the coil 16 side of the coil current detection resistor 17 (connection point b) at a predetermined constant voltage $V_{ref}$. Therefore, when the output current $I_O$ increases, the voltage $V_O$ at the output terminal OUT drops slightly in accordance with the formula below. Specifically, $$V_O = V_{ref} - I_O \times R_S \quad (5).$$

Figure 4:
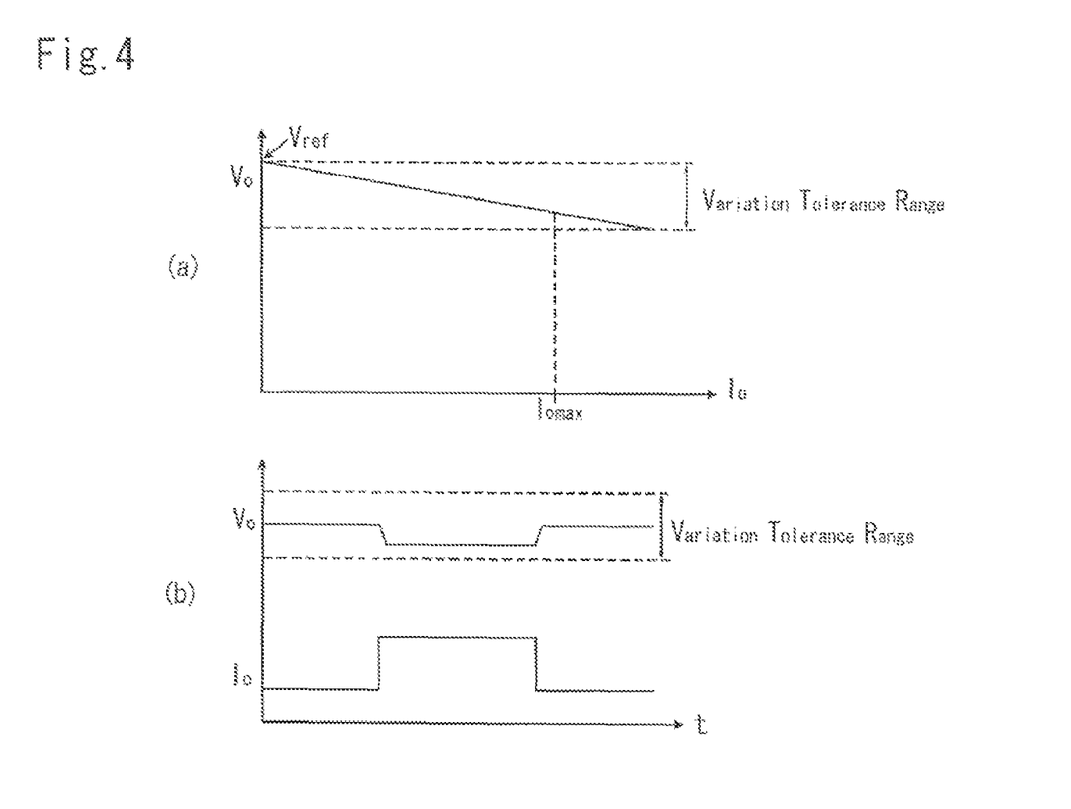
FIG. 4 illustrates the characteristics of output current and voltage at the output terminal of the DC/DC converter of FIG. 1, (a) being a DC characteristic diagram, and (b) being a transient characteristic diagram.

FIG. 4(a) illustrates the resulting DC characteristic of the output voltage $V_O$ against the output current $I_O$. In the DC/DC converter 1, moreover, the extent of the drop of output voltage $V_O$ at a user-guaranteed maximum output current $I_O$max must obviously fall within a variation tolerance range defined in the specifications.

This transient characteristic is illustrated in FIG. 4(b). As shown in the figure, undershoot and overshoot like those depicted in the above-described FIG. 6(b) can be prevented herein by reducing slightly the output voltage $V_O$ following an increase in the output current $I_O$. Specifically, when there occurs a sharp change of output current $I_O$ in response to the load 3, the output voltage $V_O$ readily changes transiently in the DC/DC converter 1 using a low-capacitance ceramic capacitor. However, by making such transient change into a change along the DC characteristic, undershot and overshoot can be suppressed until the feedback circuit of the DC/DC converter 1 is able to respond. An additional advantage is that the drop in output voltage $V_O$ in response to an increase in the output current $I_O$ allows reducing power consumption.

The problem of oscillation in the DC/DC converter 1 is discussed next. In the DC/DC converter 1, as described above, the voltage detector 21 is connected to the coil side of the coil current detection resistor 17 (connection point b) and hence, voltage is kept at a predetermined constant voltage by the reference current value control circuit 8 and the feedback circuit 9. Therefore, the resistance value ($R_{ESR}+R_S$) resulting from adding to $R_{ESR}$ the resistance value $R_S$ of the coil current detection resistor 17, replaces $R_{ESR}$ in formula (2). That is, the DC/DC converter 1 has a 1-pole/1-zero frequency characteristic in which the frequency of the pole ($f_P$) and the frequency of the zero ($f_Z$) are obtained from the formulas below.

$$f_P = 1/(2\pi \cdot R_O \cdot C_{OUT}) \quad (6)$$

$$f_Z = 1/(2\pi \cdot (R_{ESR}+R_S) \cdot C_{OUT}) \quad (7)$$

In the formulas, $R_O$ is the resistance of the load, $C_{OUT}$ is the capacitance of the smoothing capacitor 18, $R_{ESR}$ is the ESR value of the smoothing capacitor 18, and $R_S$ is the resistance of the coil current detection resistor 17. The zero frequency ($f_Z$) of the frequency characteristic is thus determined by the coil current detection resistor 17 and the smoothing capacitor 18.

Compared with formula (2), $f_Z$ is smaller in formula (7), and hence the frequency difference between $f_P$ and $f_Z$ is smaller as well, which suppresses phase rotation and restrains oscillation. Specifically, values of $f_P$=3.18 KHz and $f_Z$=79.6 KHz are obtained, in which $f_Z$ is about 25 times as large as $f_P$, by substituting the above values of a ceramic capacitor ($R_O$=0.5Ω, $C_{OUT}$=100 μF, $R_{ESR}$=5 mΩ) in formulas (6) and (7), for $R_S$=15 mΩ. In a DC/DC converter 1 having this constitution, therefore, the frequency difference between $f_Z$ and $f_P$ is identical to that of FIG. 5, in which an electrolytic capacitor is used, even using herein a low-$R_{ESR}$ ceramic capacitor.

The above-described preferred embodiments of the present invention involve using a ceramic capacitor in a DC/DC converter, but the present invention is not limited thereto and it is possible to use other kinds of capacitors to achieve effects such as preventing degradation of transient response upon load changes, or suppressing the occurrence of oscillation phenomena, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A DC/DC converter for, through the opening and closing of a switching element, supplying power from an input power supply, via a coil, to an output terminal connected to a load, and adjusting a voltage of the output terminal, the DC/DC converter comprising:

a coil current detection element interposed between the coil and the output terminal, and arranged to generate, in a terminal connected to the coil and a terminal connected to the output terminal, a detection voltage in response to a coil current;

a smoothing capacitor connected to the load side of the coil current detection element to smooth the voltage of the output terminal;

a reference current value control circuit arranged to detect the voltage of the coil side of the coil current detection element and to control a reference current value of a current flowing in the coil; and a feedback circuit having an offset voltage generator arranged to generate an offset voltage that corresponds to the reference current value in response to an output voltage of the reference current value control circuit, and arranged to close the switching element in synchronization with a reference clock signal of a clock signal generator, and open the switching element in response to comparing the detection voltage with the offset voltage when the current flowing in the coil exceeds the reference current value.

2. The DC/DC converter according to claim 1, wherein the coil current detection element is a coil current detection resistor.

3. The DC/DC converter according to claim 1, wherein the smoothing capacitor is a ceramic capacitor.

4. The DC/DC converter according to claim 1, wherein an equivalent series resistance value of the smoothing capacitor is smaller than that of an electrolytic capacitor.

5. The DC/DC converter according to claim 1, wherein the resistance value of the coil current detection element is larger than the equivalent series resistance value of the smoothing capacitor.

6. The DC/DC converter according to claim 1, wherein the zero frequency of a frequency characteristic is determined by the coil current detection element and the smoothing capacitor.

* * * * *